US009485358B2

(12) United States Patent
Xu

(10) Patent No.: US 9,485,358 B2
(45) Date of Patent: Nov. 1, 2016

(54) INFORMATION ACQUISITION METHOD, DEVICE, AND SYSTEM

(71) Applicant: Xiaomi Inc., Beijing (CN)

(72) Inventor: Ruijun Xu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/696,624

(22) Filed: Apr. 27, 2015

(65) Prior Publication Data
US 2016/0094714 A1    Mar. 31, 2016

Related U.S. Application Data

(63) Continuation of application No. PCT/CN2015/071260, filed on Jan. 21, 2015.

(30) Foreign Application Priority Data

Sep. 26, 2014  (CN) .......................... 2014 1 0505497

(51) Int. Cl.
*H04M 3/00*  (2006.01)
*H04M 5/00*  (2006.01)
*H04M 3/51*  (2006.01)

(52) U.S. Cl.
CPC ............. *H04M 3/5175* (2013.01); *H04M 3/51* (2013.01); *H04M 3/5191* (2013.01); *H04M 2203/401* (2013.01)

(58) Field of Classification Search
CPC ........... H04M 3/5183; H04M 3/5191; H04M 2203/401; H04M 2203/40
USPC ............. 379/265.09, 265.06, 265.01, 265.03
See application file for complete search history.

(56) References Cited

U.S. PATENT DOCUMENTS

| 2007/0160054 | A1  | 7/2007 | Shaffer et al. |
| 2010/0166171 | A1  | 7/2010 | Velusamy |
| 2012/0190333 | A1* | 7/2012 | Portman ............ H04L 65/4007 455/411 |
| 2014/0022328 | A1* | 1/2014 | Gechter ................ G06Q 30/06 348/14.02 |
| 2015/0010139 | A1* | 1/2015 | Tuchman ........... G06Q 30/0601 379/265.09 |

FOREIGN PATENT DOCUMENTS

| CN | 101453526 A | 6/2009 |
| CN | 102083245 A | 6/2011 |
| CN | 102170614 A | 8/2011 |
| CN | 102546723 A | 7/2012 |

(Continued)

OTHER PUBLICATIONS

International Search Report of PCT Application No. PCT/CN2015/071260, mailed Jun. 25, 2015, issued by the State Intellectual Property Office of P.R. China as ISA (4 pages).

(Continued)

*Primary Examiner* — Thjuan K Addy
(74) *Attorney, Agent, or Firm* — Finnegan, Henderson, Farabow, Garrett & Dunner LLP

(57) ABSTRACT

An information acquisition method includes establishing a data channel with a telephone agent system when a voice call is conducted with the telephone agent system, displaying an information acquisition page provided by the telephone agent system through the data channel, receiving feedback information via the information acquisition page, and sending the feedback information to the telephone agent system through the data channel.

16 Claims, 14 Drawing Sheets

(56) References Cited

FOREIGN PATENT DOCUMENTS

| | | |
|---|---|---|
| CN | 102572128 A | 7/2012 |
| CN | 103455860 A | 12/2013 |
| CN | 103458134 A | 12/2013 |
| CN | 104298430 A | 1/2015 |
| RU | 2361373 C2 | 7/2009 |
| WO | WO 00/49794 A1 | 8/2000 |
| WO | WO 2013/103696 A2 | 7/2013 |

OTHER PUBLICATIONS

Extended European Search Report of European Application No. 15186589 dated Feb. 15, 2016 (8 pages).
Translation of International Search Report of International Application No. PCT/CN2015/071260 dated Jun. 25, 2015 (2 pages).
Russian Office Action of Russian Application No. 2015111192/08(017472), mailed Apr. 21, 2016 (13 pages including translation).

\* cited by examiner

INFORMATION ACQUISITION METHOD, DEVICE, AND SYSTEM

This application is a Continuation Application of International Application No. PCT/CN2015/071260, with an international filing date of Jan. 21, 2015, which is based on and claims priority to Chinese Patent Application No. 201410505497.2, filed on Sep. 26, 2014, the entire contents of both of which are incorporated herein by reference.

TECHNICAL FIELD

The present disclosure relates to call answering and, more particularly, to an information acquisition method, device, and system.

BACKGROUND

A telephone agent system is a call answering system that requires participation of customer service staffs. Enterprises usually use telephone agent systems to provide services such as business consulting, business transaction, and customer survey.

For example, a telephone agent system can be used to conduct a user satisfaction survey. After a conversation between a user and a customer service staff of the telephone agent system is completed, the telephone agent system sends a text message to the user for conducting a satisfaction survey. After receiving the text message, the user returns a satisfaction survey result in the form of text message and in the required format of the satisfaction survey text message. After receiving the satisfaction survey result, the telephone agent system extracts user satisfaction from the text message.

SUMMARY

In accordance with the present disclosure, there is provided an information acquisition method. The method includes establishing a data channel with a telephone agent system when a voice call is conducted with the telephone agent system, displaying an information acquisition page provided by the telephone agent system through the data channel, receiving feedback information via the information acquisition page, and sending the feedback information to the telephone agent system through the data channel.

Also in accordance with the present disclosure, there is provided an information acquisition method. The method includes establishing a data channel with a user terminal when a voice call is conducted with the user terminal, providing an information acquisition page to the user terminal through the data channel, and receiving feedback information sent by the user terminal through the data channel.

Also in accordance with the present disclosure, there is provided an information acquisition device including a processor and a non-transitory computer readable storage medium storing instructions. The instructions, when executed by the processor, cause the processor to establish a data channel with a telephone agent system when a voice call is conducted with the telephone agent system, display an information acquisition page provided by the telephone agent system through the data channel, receive feedback information via the information acquisition page, and send the feedback information to the telephone agent system through the data channel.

Also in accordance with the present disclosure, there is provided an information acquisition device including a processor and a non-transitory computer readable storage medium storing instructions. The instructions, when executed by the processor, cause the processor to establish a data channel with a user terminal when a voice call is conducted with the user terminal, provide an information acquisition page to the user terminal through the data channel, and receive feedback information sent by the user terminal through the data channel.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Embodiments consistent with the present disclosure include an information acquisition method, device, and system. Unless otherwise specified, a voice call in the present disclosure generally uses a "voice channel" established in a Circuit Switched (CS) domain, where the voice channel is configured to conduct a telephone voice service. Further, a "data channel" as disclosed here generally refers to a channel established in a Packet Switched (PS) domain or in the Internet, configured to conduct a data transmission service.

Figure 1A:
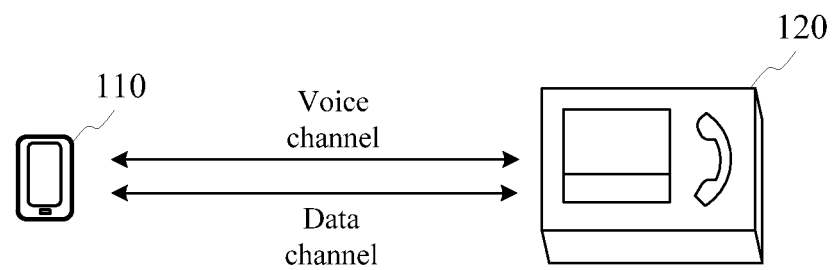
FIG. 1A and FIG. 1B are schematic diagrams illustrating two implementation environments of an information acquisition method according to embodiments of the present disclosure.

FIG. 1A is a schematic diagram illustrating an exemplary implementation environment of an information acquisition method according to embodiments of the present disclosure. The implementation environment shown in FIG. 1A includes a user terminal 110 and a telephone agent system 120. The user terminal 110 is electronic equipment capable of establishing a data channel when conducting a voice call, such as a smart phone or a tablet computer with telephone function. The telephone agent system 120 is electronic equipment capable of establishing a data channel when conducting a voice call. A voice channel and a data channel can be established between the user terminal 110 and the telephone agent system 120.

Figure 1B:
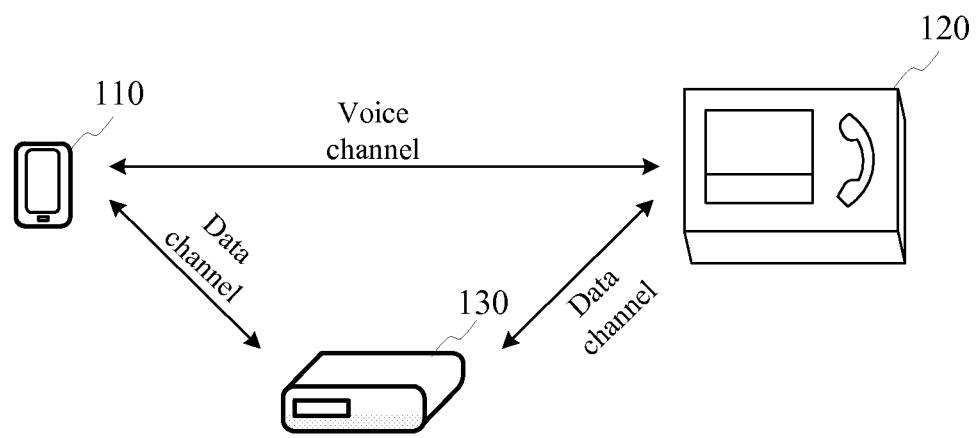

FIG. 1B is a schematic diagram illustrating another exemplary implementation environment of an information acquisition method according to embodiments of the present disclosure. The implementation environment shown in FIG. 1B is similar to that shown in FIG. 1A but additionally includes a third-party service platform 130, which may be a server, a server cluster including a plurality of servers, or a cloud computing service center. A voice channel can be directly established between the user terminal 110 and the telephone agent system 120. Alternatively, a data channel can be established between the user terminal 110 and the telephone agent system 120 via the third-party service platform 130.

Figure 2:
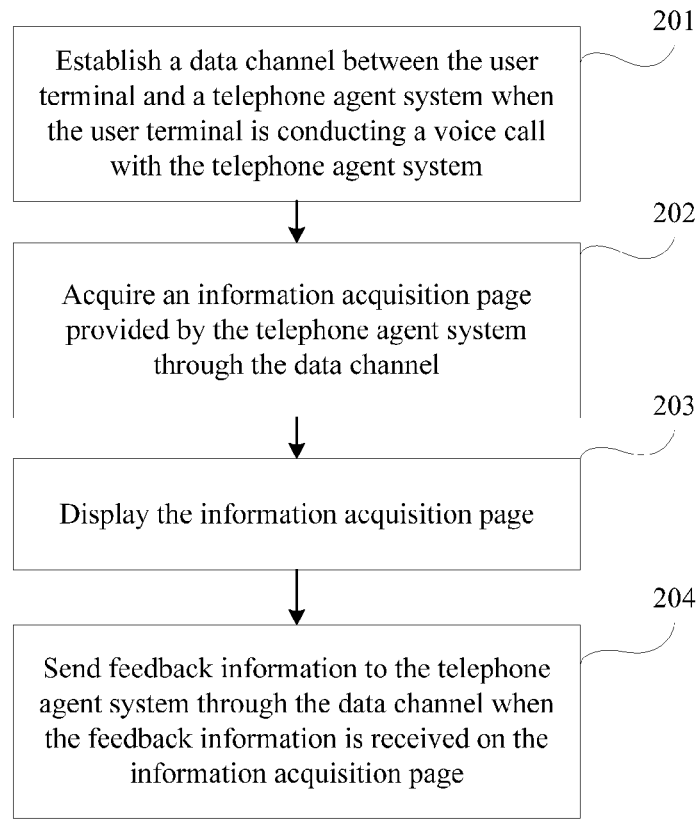
FIG. 2 is a flowchart illustrating an information acquisition method according to an exemplary embodiment.

FIG. 2 is a flowchart illustrating an exemplary information acquisition method consistent with embodiments of the present disclosure. The method shown in FIG. 2 can be implemented in the user terminal 110 in the implementation environment shown in FIG. 1A.

As shown in FIG. 2, at 201, a data channel is established between the user terminal and a telephone agent system when the user terminal is conducting a voice call with the telephone agent system. At 202, an information acquisition page provided by the telephone agent system is acquired through the data channel. At 203, the information acquisition page is displayed. At 204, when feedback information is acquired on the information acquisition page, the acquired feedback information is sent to the telephone agent system through the data channel.

Figure 3:
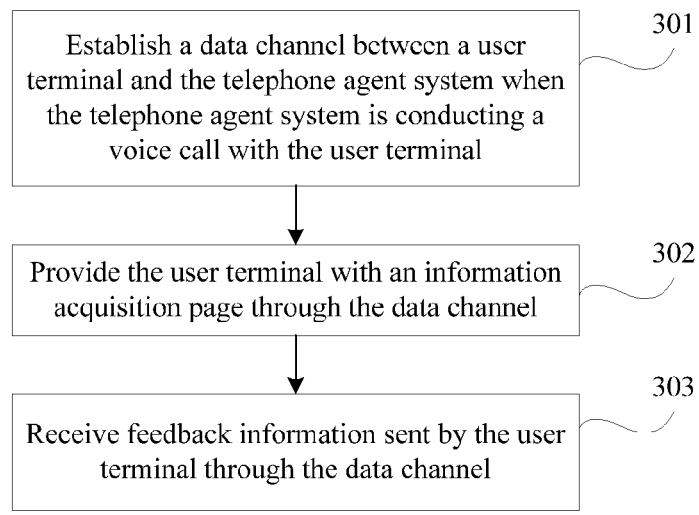
FIG. 3 is a flowchart illustrating an information acquisition method according to another exemplary embodiment.

FIG. 3 is a flowchart illustrating another exemplary information acquisition method consistent with embodiments of the present disclosure. The method shown in FIG. 3 can be implemented in the telephone agent system 120 in the implementation environment shown in FIG. 1A.

As shown in FIG. 3, at 301, a data channel is established between a user terminal and the telephone agent system when the telephone agent system is conducting a voice call with the user terminal. At 302, an information acquisition page is provided to the user terminal through the data channel, where the user terminal is configured to display the information acquisition page and receive feedback information on the information acquisition page. At 303, the feedback information sent by the user terminal is received through the data channel.

Here, unless otherwise specified, "when conducting a voice call" may include a predetermined time period before establishing the voice channel, a time period during which the voice channel exists, and a predetermined time period after disconnecting the voice channel.

In the first embodiment, user satisfaction survey results are acquired from a user terminal after the telephone agent system ends a conversation.

Figure 4A:
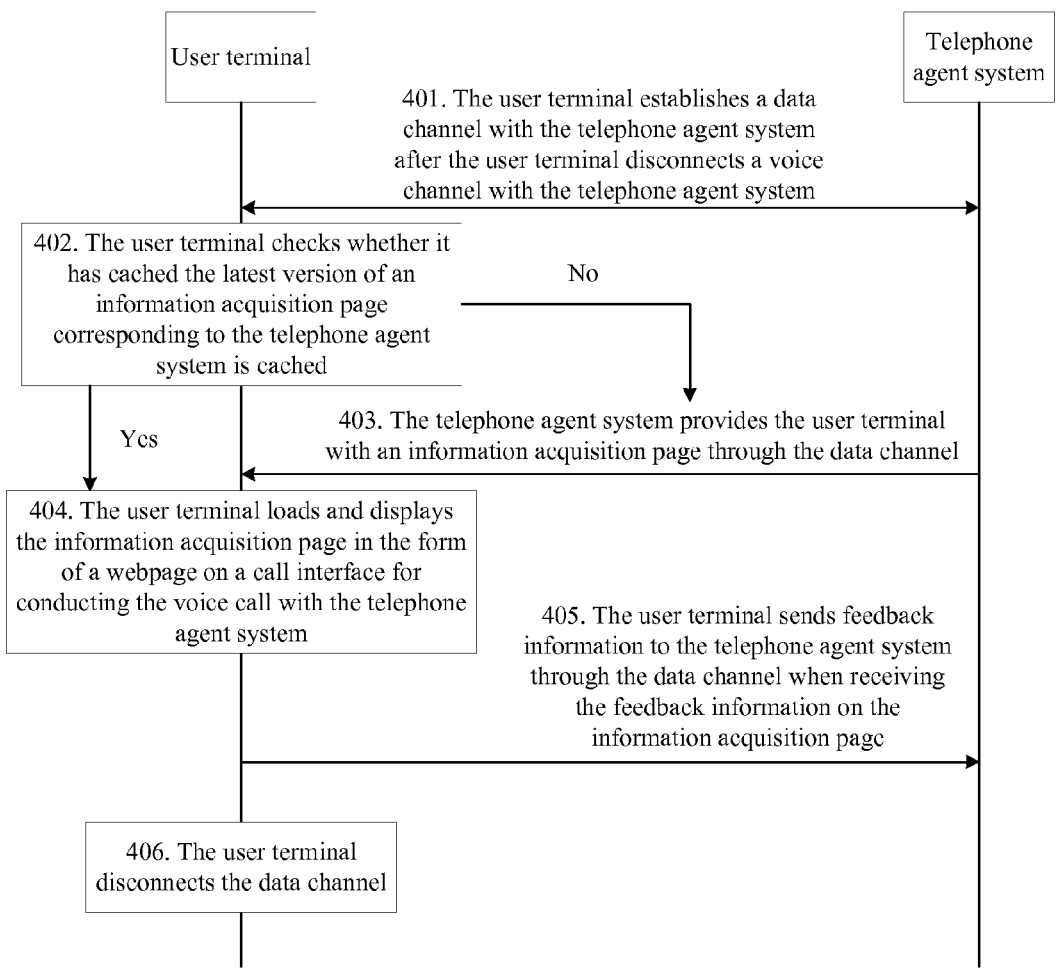
FIG. 4A is a flowchart illustrating an information acquisition method according to another exemplary embodiment.

FIG. 4A is a flowchart illustrating an exemplary information acquisition method consistent with embodiments of the present disclosure. The information acquisition method shown in FIG. 4A can be employed to acquire user satisfaction survey results after the telephone agent system has ended a conversation with a user terminal, and can be implemented in the implementation environment shown in FIG. 1A or 1B.

As shown in FIG. 4A, at 401, the user terminal establishes a data channel with the telephone agent system after the user terminal disconnects a voice channel with the telephone agent system. That is, after a voice call between the user terminal and the telephone agent system is ended, a data channel can be established between the user terminal and the telephone agent system for conducting a satisfaction survey or other kinds of surveys. The data channel can be established, for example, directly between the user terminal and the telephone agent system, or indirectly through a third-party service platform. The third-party service platform is configured to record various data related to respective user terminals during information acquisition.

In the direct establishing approach, the telephone agent system sends a data channel establishment request to the user terminal. That is, upon completion of a call with the user terminal, the telephone agent system sends the data channel establishment request to the user terminal if a satisfaction survey is needed. After receiving the data channel establishment request, the user terminal can establish a data channel with the telephone agent system. The user can decide whether to establish the data channel between the user terminal and the telephone agent system.

In some embodiments, the user terminal sends the data channel establishment request to the telephone agent system, which establishes the data channel after receiving the request.

In the indirect establishing approach, the telephone agent system sends a data channel establishment request to the third-party service platform, requesting to establish a data channel with a user terminal. The third-party service platform sends the received data channel establishment request to the corresponding user terminal. After receiving the data channel establishment request, the user terminal can establish a data channel with the telephone agent system through the third-party service platform. That is, first, a data channel is established between the telephone agent system and the third-party service platform, and then another data channel is established between the user terminal and the third-party service platform. After the data channels are successfully established, all data transmitted between the user terminal and the telephone agent system are forwarded by the third-party service platform.

At 402, the user terminal checks whether it has cached the latest version of the information acquisition page corresponding to the telephone agent system. That is, after the data channel has been established between the user terminal and the telephone agent system, the user terminal first checks whether it has locally cached the latest version of the information acquisition page corresponding to the telephone agent system, by checking, for example, a call history log. If so, the information acquisition page is displayed. If the user terminal does not have the latest version of the information acquisition page cached, it needs to acquire the information acquisition page provided by the telephone agent system through the data channel.

According to the present disclosure, if the user terminal does not cache the information acquisition page at all, the process proceeds to 403 directly. On the other hand, if an information acquisition page is cached in the user terminal, the user terminal can determine whether the information acquisition page cached therein is the latest version according to a version number of the latest version of the information acquisition page obtained from the telephone agent system through the data channel. If the user terminal determines that the information acquisition page cached therein is not the latest version, i.e., is a historical version, the process proceeds to 403. If the user terminal determines that the information acquisition page cached therein is the latest version, the process proceeds to 404.

In some embodiments, after the user terminal determines that it does not have the latest version of the information acquisition page corresponding to the telephone agent system, the user terminal can so inform the telephone agent system by sending the latter an instruction of waiting for receiving an information acquisition page.

At 403, the telephone agent system provides the user terminal with an information acquisition page through the data channel. That is, after receiving the instruction of waiting for receiving an information acquisition page sent by the user terminal, the telephone agent system provides the user terminal with the information acquisition page. The information acquisition page can be a page in the form of a webpage, which may be based on the Hyper Text Markup Language (HTML) standard.

In some embodiments, the user terminal sends a page acquisition request to the telephone agent system through the data channel, and the telephone agent system provides the user terminal with the information acquisition page in the form of a webpage according to the page acquisition request. The page acquisition request can be sent by the user terminal automatically or under an instruction from the user operating the user terminal.

An information acquisition page may include one or more subpages. Thus the page acquisition request may be a request to acquire all subpages of the information acquisition page, or a request to acquire only one subpage of the information acquisition page. For example, the homepage of the information acquisition page is acquired first, and when a button in the homepage is pressed, a subpage corresponding to the button is acquired.

In some embodiments, the telephone agent system pushes the information acquisition page in the form of a webpage to the user terminal through the data channel. The push process can be controlled by the customer service staff of the telephone agent system.

In some embodiments, if a historical version of the information acquisition page (also referred to as a "historical information acquisition page") is cached in the user terminal, the user terminal may not need to receive the part of the information acquisition page that is the same as that in the historical information acquisition page. In some embodiments, the version information acquired by the user terminal at 402 may contain judgment information needed to determine which part of the information acquisition page is the same in the historical version and the latest version. Alternatively, the telephone agent system can acquire the version number of the historical information acquisition page cached in the user terminal, and then send the part of the latest version of the information acquisition page that is different from the historical information acquisition page to the user terminal according to the version number. This can reduce waste of communication resource and improve information acquisition efficiency.

At 404, the user terminal loads and displays the information acquisition page in the form of a webpage on a call interface used for conducting the voice call with the telephone agent system. That is, although the voice channel between the user terminal and the telephone agent system has been disconnected at this moment, the user terminal can still load and display the information acquisition page on the call interface.

According to the present disclosure, the information acquisition page may include one or more subpages organized in a tree structure. When the information acquisition page includes multiple subpages, the user terminal can control the display of the information acquisition page according to a display control signal from the user and/or the customer service staff, for example, to switch the currently displayed information acquisition page.

In some embodiments, the user terminal receives the display control signal triggered by the user, i.e., the user sends the display control signal by operating the user terminal. The user can send the signal through an input on the information acquisition page.

Figure 4B:
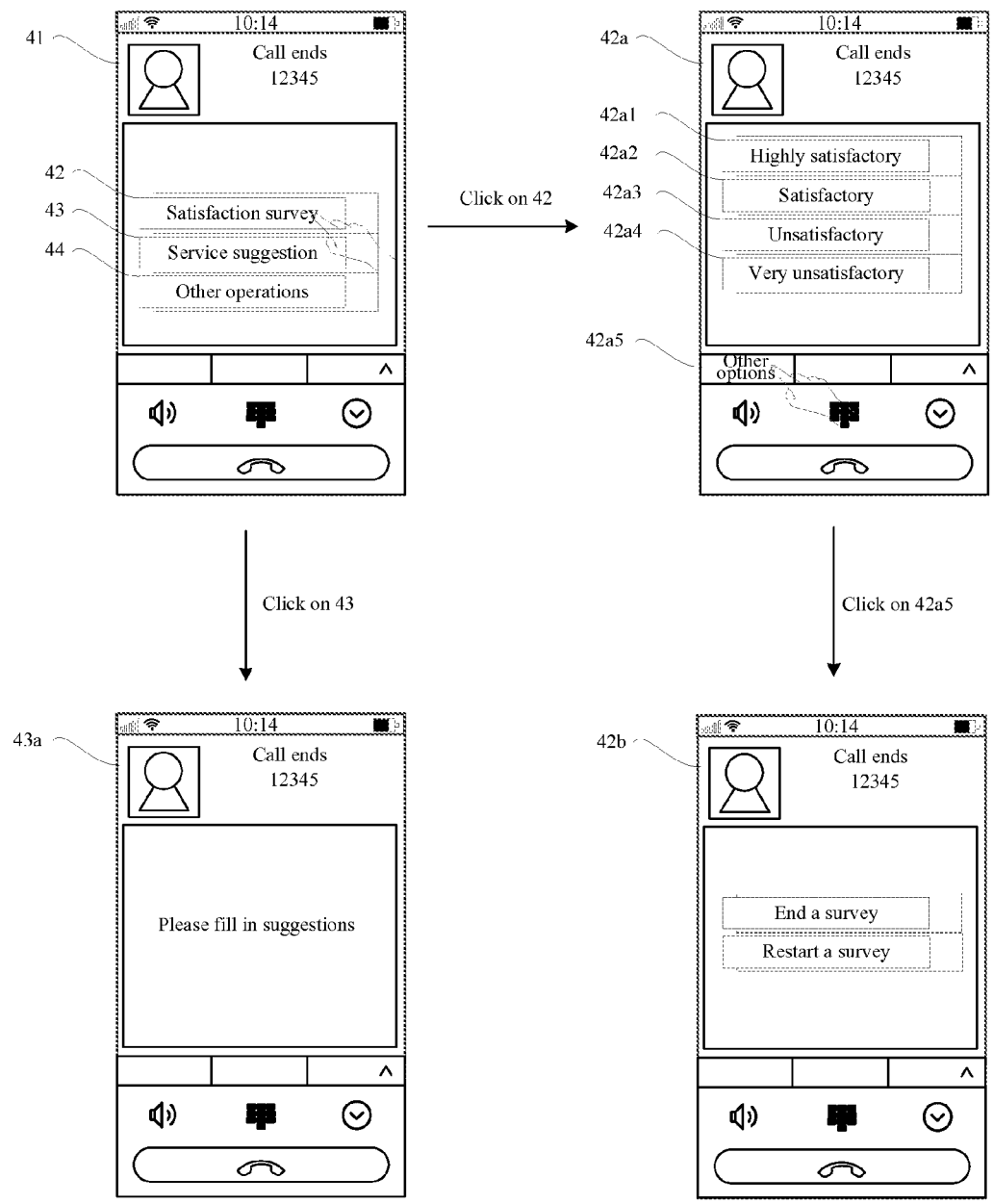
FIG. 4B is a schematic diagram illustrating an information acquisition page according to the embodiment shown in FIG. 4A.

For example, as shown in FIG. 4B, a page 41 is a homepage of an information acquisition page in the form of a webpage, including a "Satisfaction survey" button 42, a "Service suggestion" button 43, and an "Other operations" button 44. When the user clicks on the button 42, the user terminal switches to a subpage 42a. When the user clicks on the button 43, the user terminal switches to a subpage 43a. The subpage 42a includes a "Highly satisfactory" button 42a1, a "Satisfactory" button 42a2, an "Unsatisfactory" button 42a3, a "Very unsatisfactory" button 42a4, and an "Other options" button 42a5. When the user clicks on the button 42a5, the user terminal switches to a subpage 42b that is a subpage of the subpage 42a.

In some embodiments, the display control signal is sent by the customer service staff. In this scenario, the telephone agent system receives a display control instruction, which can be sent by the customer service staff of the telephone agent system via the telephone agent system, or can be sent by a preset program in the telephone agent system. The telephone agent system sends a display control signal to the user terminal according to the display control instruction, after receiving the display control instruction. The user terminal receives the display control signal sent by the telephone agent system through the data channel.

That is, the user terminal may be controlled by at least one of the user or the telephone agent system, and the user terminal may acquire the display control signal through at least one of the two approaches described above. After acquiring the display control signal, the user terminal displays the information acquisition page on the call interface according to the display control signal.

For example, as shown in FIG. 4B, the customer service staff of the telephone agent system can directly control the user terminal to display the subpage 42a through the display control signal to conduct the satisfaction survey.

At 405, when the user terminal receives the feedback information on the information acquisition page, it sends the feedback information to the telephone agent system through the data channel. For example, as shown in FIG. 4B, after the user terminal enters into the subpage 42a according to the operation of the user or under the control of the telephone agent system, the user can send the feedback information by clicking on one of the "Highly satisfactory"

button 42*a*1, the "Satisfactory" button 42*a*2, the "Unsatisfactory" button 42*a*3, or the "Very unsatisfactory" button 42*a*4, and the feedback information can includes a user satisfaction survey result. When the telephone agent system receives the feedback information sent by the user terminal through the data channel, it acquires the user satisfaction survey result.

At 406, the user terminal disconnects the data channel. That is, after sending the feedback information to the telephone agent system, the user terminal can disconnect the data channel, thus ending the information acquisition process.

Figure 5A:
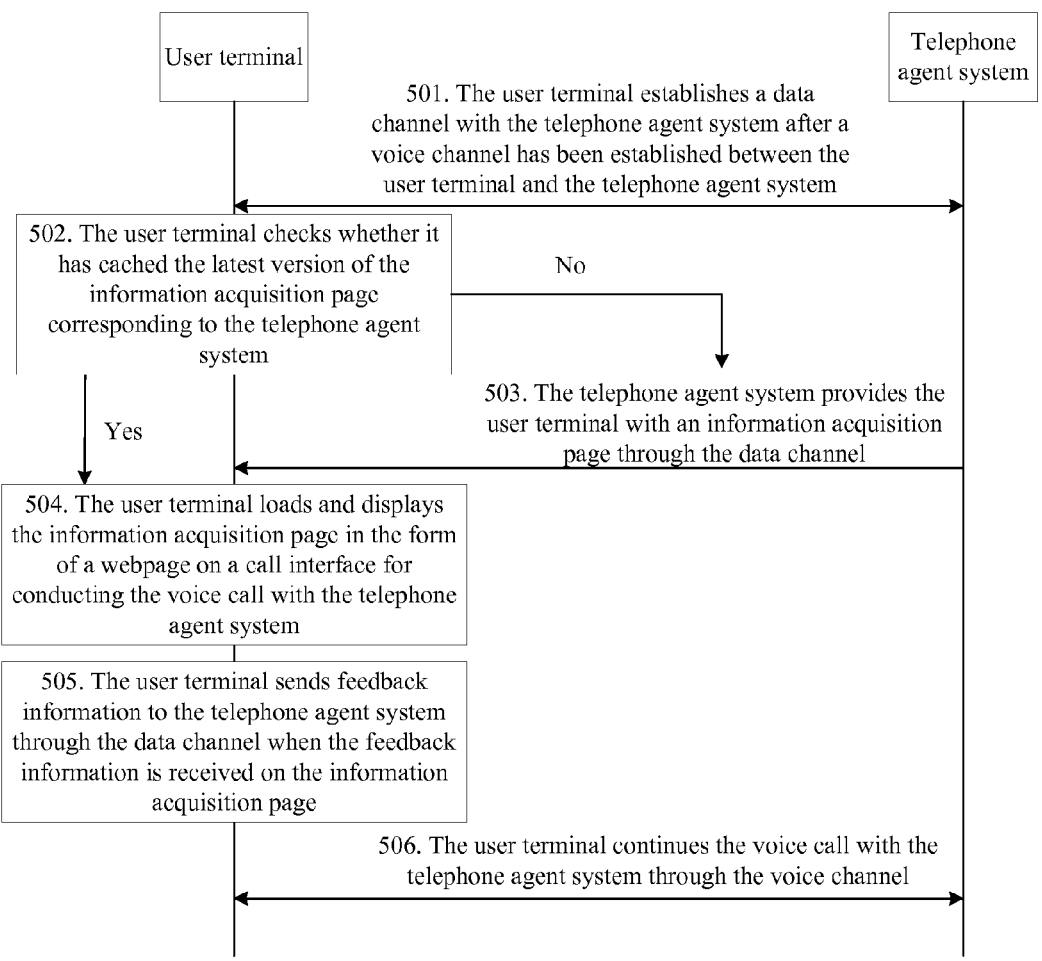
FIG. 5A is a flowchart illustrating an information acquisition method according to another exemplary embodiment.

FIG. 5A is a flowchart illustrating another exemplary information acquisition method consistent with embodiments of the present disclosure. The information acquisition method shown in FIG. 5A can be employed to conduct a questionnaire survey during a voice call between the user terminal and the telephone agent system, and can be implemented in the implementation environments as shown in FIG. 1A or 1B.

At 501, the user terminal establishes a data channel with the telephone agent system after a voice channel has been established between the user terminal and the telephone agent system. The data channel is established to conduct the questionnaire survey. The manner of establishing the data channel at 501 is similar to that at 401 of FIG. 4A.

At 502, the user terminal checks whether it has cached the latest version of the information acquisition page corresponding to the telephone agent system. That is, after the data channel has been established between the user terminal and the telephone agent system, the user terminal first checks whether it has locally cached the latest version of the information acquisition page corresponding to the telephone agent system. If so, the information acquisition page is displayed. If the user terminal does not have the latest version of the information acquisition page cached, it needs to acquire the information acquisition page provided by the telephone agent system through the data channel.

According to the present disclosure, if the user terminal does not cache the information acquisition page at all, the process proceeds to 503 directly. On the other hand, if an information acquisition page is cached in the user terminal, the user terminal can determine whether the information acquisition page cached therein is the latest version according to a version number of the latest version of the information acquisition page obtained through the data channel. If the user terminal determines that the information acquisition page cached therein is not the latest version, i.e., is a historical version, the process proceeds to 503. If the user terminal determines that the information acquisition page cached therein is the latest version, the process proceeds to 504.

In some embodiments, after the user terminal determines that it does not have the latest version of the information acquisition page corresponding to the telephone agent system, the user terminal can so inform the telephone agent system by sending the latter an instruction of waiting for receiving an information acquisition page.

At 503, the telephone agent system provides the user terminal with an information acquisition page through the data channel. That is, after receiving the instruction of waiting for receiving an information acquisition page sent by the user terminal, the telephone agent system provides the user terminal with the information acquisition page. The information acquisition page can be a page in the form of a webpage, which may be based on the Hyper Text Markup Language (HTML) standard. The information acquisition page can be provided to the user terminal at the request of the user terminal, or can be provided directly by the telephone agent system directly pushing the information acquisition page to the user terminal. These approaches are similar to those at 403 in FIG. 4A described above.

In some embodiments, the above two approaches for acquiring an information acquisition page may be combined. For example, the user terminal may first send a page acquisition request and acquire a homepage of an information acquisition page from the telephone agent system. When the user presses on a button in the homepage, the user terminal acquires a subpage corresponding to the button from the telephone agent system. After the user terminal displays a subpage, based on the voice call between the user and the customer service staff, the customer service staff may also push another subpage of the information acquisition page to the user terminal through the telephone agent system for displaying on the user terminal.

In some embodiments, if a historical information acquisition page is cached in the user terminal, the user terminal may not need to receive the part of the information acquisition page that is the same as that in the historical information acquisition page. In some embodiments, the version information acquired by the user terminal at 502 may contain judgment information needed to determine which part of the information acquisition page is the same in the historical version and the latest version. Alternatively, the telephone agent system can acquire the version number of the historical information acquisition page cached in the user terminal, and then send the part of the latest version of the information acquisition page that is different from the historical information acquisition page to the user terminal according to the version number. This can reduce waste of communication resource and improve information acquisition efficiency.

At 504, the user terminal loads and displays the information acquisition page in the form of a webpage on a call interface used for conducting the voice call with the telephone agent system. The voice call is carried by the voice channel.

According to the present disclosure, the information acquisition page may include one or more subpages organized in a tree structure. When the information acquisition page includes multiple subpages, the user terminal can control the display of the information acquisition page according to a display control signal from the user and/or the customer service staff, for example, to switch the currently displayed information acquisition page.

In some embodiments, the user terminal receives the display control signal triggered by the user, i.e., the user sends the display control signal by operating the user terminal. The user can send the signal through an input on a preset page, which may be a page pre-stored on the user terminal.

Figure 5B:
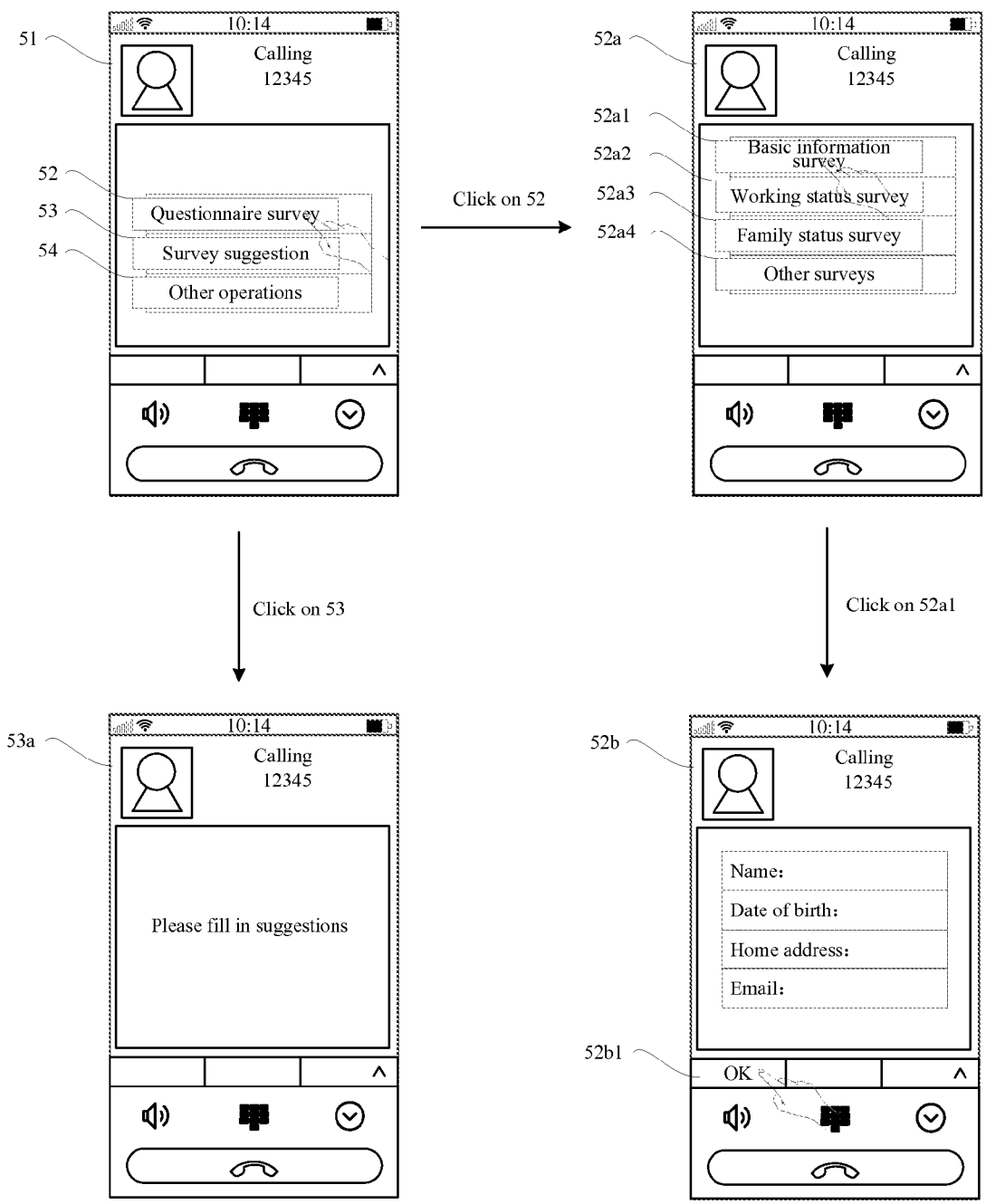
FIG. 5B is a schematic diagram illustrating an information acquisition page according to the embodiment shown in FIG. 5A.

For example, as shown in FIG. 5B, a page 51 is a homepage of an information acquisition page in the form of a webpage, including a "Questionnaire survey" button 52, a "Survey suggestion" button 53, and an "Other operations" button 54. When the user clicks on the button 52, the user terminal switches to a subpage 52*a*. When the user clicks on the button 53, the user terminal switches to a subpage 53*a*. The subpage 52*a* includes a "Basic information survey" button 52*a*1, a "Working status survey" button 52*a*2, a "Family status survey" button 52*a*3, and an "Other surveys" button 52*a*4. When the user clicks on the button 52*a*1, the user terminal switches to a subpage 52*b* that is a subpage of the subpage 52*a*, to conduct the basic information survey.

In some embodiments, the display control signal is sent by the customer service staff. In this scenario, the telephone agent system receives a display control instruction, which can be sent by the customer service staff of the telephone agent system via the telephone agent system, or can be sent by a preset program in the telephone agent system. The telephone agent system sends a display control signal to the user terminal according to the display control instruction, after receiving the display control instruction. The user terminal receives the display control signal sent by the telephone agent system through the data channel.

For example, as shown in FIG. 5B, the customer service staff of the telephone agent system can directly control the user terminal to display the subpage 52b to conduct the basic information survey.

In some embodiments, the user terminal may acquire the display control signal through at least one of the two approaches described above, and the user terminal may be controlled by at least one of the user or the telephone agent system. After acquiring the display control signal, the user terminal displays the information acquisition page on the call interface according to the display control signal.

At 505, when the user terminal receives the feedback information on the information acquisition page, it sends the feedback information to the telephone agent system through the data channel. For example, as shown in FIG. 5B, the user enters basic information on the subpage 52b and hits an "OK" button 52b1. The user terminal then sends the basic information entered by the user to the telephone agent system as the feedback information. When the telephone agent system receives the feedback information sent by the user terminal through the data channel, the questionnaire survey is finished.

In some embodiments, when the user is completing the questionnaire survey, the telephone agent system can assist the user through the voice channel, such as explaining things to the user that need the user's attention.

At 506, the user terminal continues the voice call with the telephone agent system through the voice channel. That is, after sending the feedback information to the telephone agent system, the user terminal can disconnect the data channel and continue the voice call with the telephone agent system, or continue the voice call with the telephone agent system without disconnecting the data channel to allow the voice channel and the data channel to work together.

Figure 6A:
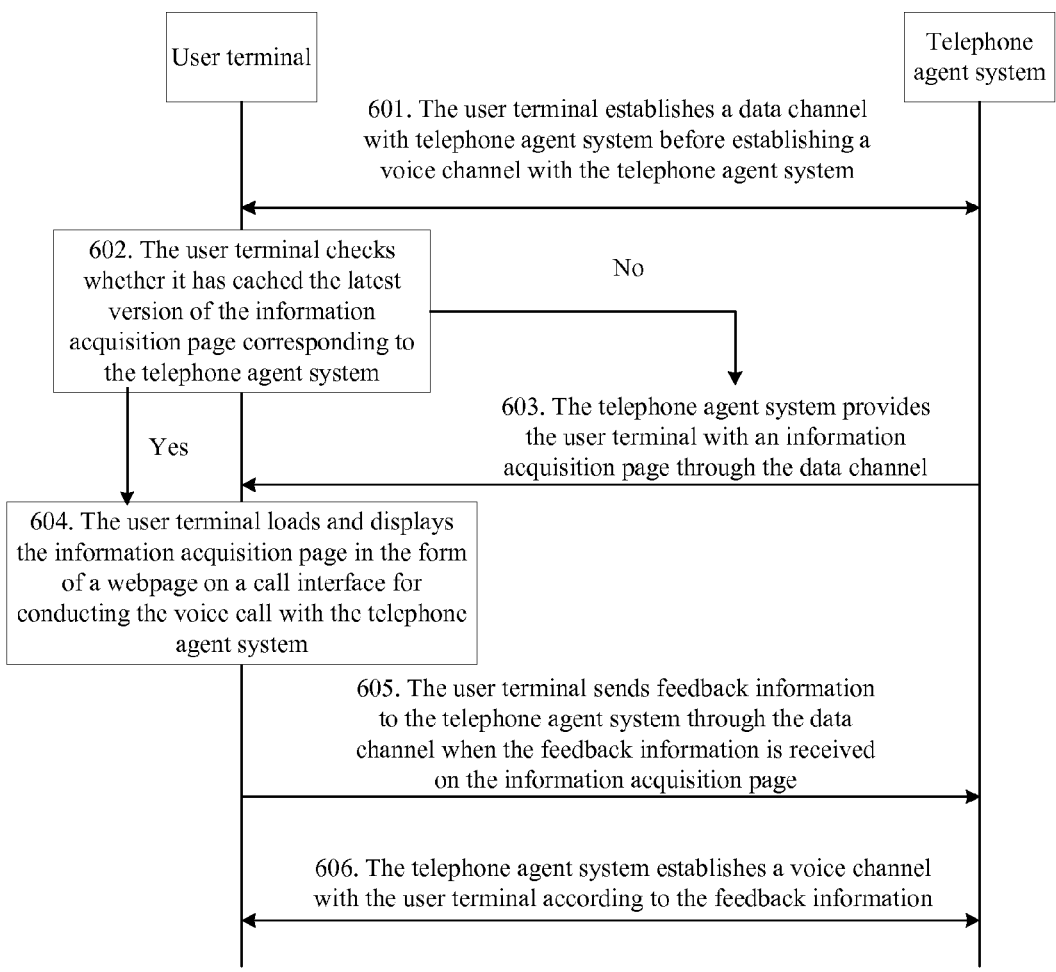
FIG. 6A is a flowchart illustrating an information acquisition method according to another exemplary embodiment.

FIG. 6A is a flowchart illustrating another exemplary information acquisition method consistent with embodiments of the present disclosure. The information acquisition method shown in FIG. 6A can be employed to allow the telephone agent system to acquire information about what voice service the user terminal needs, and can be implemented in the implementation environment shown in FIG. 1A or 1B.

As shown in FIG. 6A, at 601, the user terminal establishes a data channel with the telephone agent system before establishing a voice channel with the telephone agent system. The manner of establishing the data channel at 601 is similar to that at 401 of FIG. 4A.

At 602, the user terminal checks whether it has cached the latest version of the information acquisition page corresponding to the telephone agent system. The manner of checking whether the user terminal has the latest version of the information acquisition page at 602 is similar to that at 402 of FIG. 4A. If the user terminal does not have any version of the information acquisition page cached therein or if the user terminal only has a historical version of the information acquisition page, the process proceed to 603. If the user terminal has cached the latest version of the information acquisition page, the process proceeds to 604.

At 603, the telephone agent system provides the user terminal with an information acquisition page through the data channel. That is, after receiving the instruction of waiting for receiving an information acquisition page sent by the user terminal, the telephone agent system provides the user terminal with the information acquisition page. The information acquisition page can be a page in the form of a webpage, which may be based on the Hyper Text Markup Language (HTML) standard.

In some embodiments, the user terminal sends a page acquisition request to the telephone agent system through the data channel, and the telephone agent system provides the user terminal with the information acquisition page in the form of a webpage according to the page acquisition request. The page acquisition request can be sent by the user terminal automatically or under an instruction from the user operating the user terminal.

An information acquisition page may include one or more subpages. Thus the page acquisition request may be a request to acquire all subpages of the information acquisition page, or a request to acquire only one subpage of the information acquisition page. For example, the homepage of the information acquisition page is acquired first, and when a button in the homepage is pressed, a subpage corresponding to the button is acquired.

In some embodiments, the telephone agent system pushes the information acquisition page in the form of a webpage to the user terminal through the data channel. The push process can be controlled by the customer service staff of the telephone agent system.

Similarly, since an information acquisition page may include one or more subpages, the telephone agent system can push all the subpages of the information acquisition page in one push operation, or only push one subpage of the information acquisition page in one push operation, as controlled by the customer service staff.

The above two approaches can be combined. For example, the telephone agent system first pushes the homepage of the information acquisition page to the user terminal. When the user presses on a button on the homepage, the user terminal sends the telephone agent system a request to acquire a subpage corresponding to that button, and receives that subpage sent by the telephone agent system.

At 604, the user terminal loads and displays the information acquisition page in the form of a webpage on a call interface used for conducting the voice call with the telephone agent system. That is, although the voice channel between the user terminal and the telephone agent system has not been established at this moment, the user terminal can still enter the call interface, and load and display the information acquisition page on the call interface.

According to the present disclosure, the information acquisition page may include one or more subpages organized in a tree structure. When the information acquisition page includes multiple subpages, the user terminal can control the display of the information acquisition page according to a display control signal from the user and/or the customer service staff, for example, to switch the currently displayed information acquisition page.

In some embodiments, the user terminal receives the display control signal triggered by the user, i.e., the user sends the display control signal by operating the user terminal. The user can send the signal through an input on the information acquisition page.

Figure 6B:
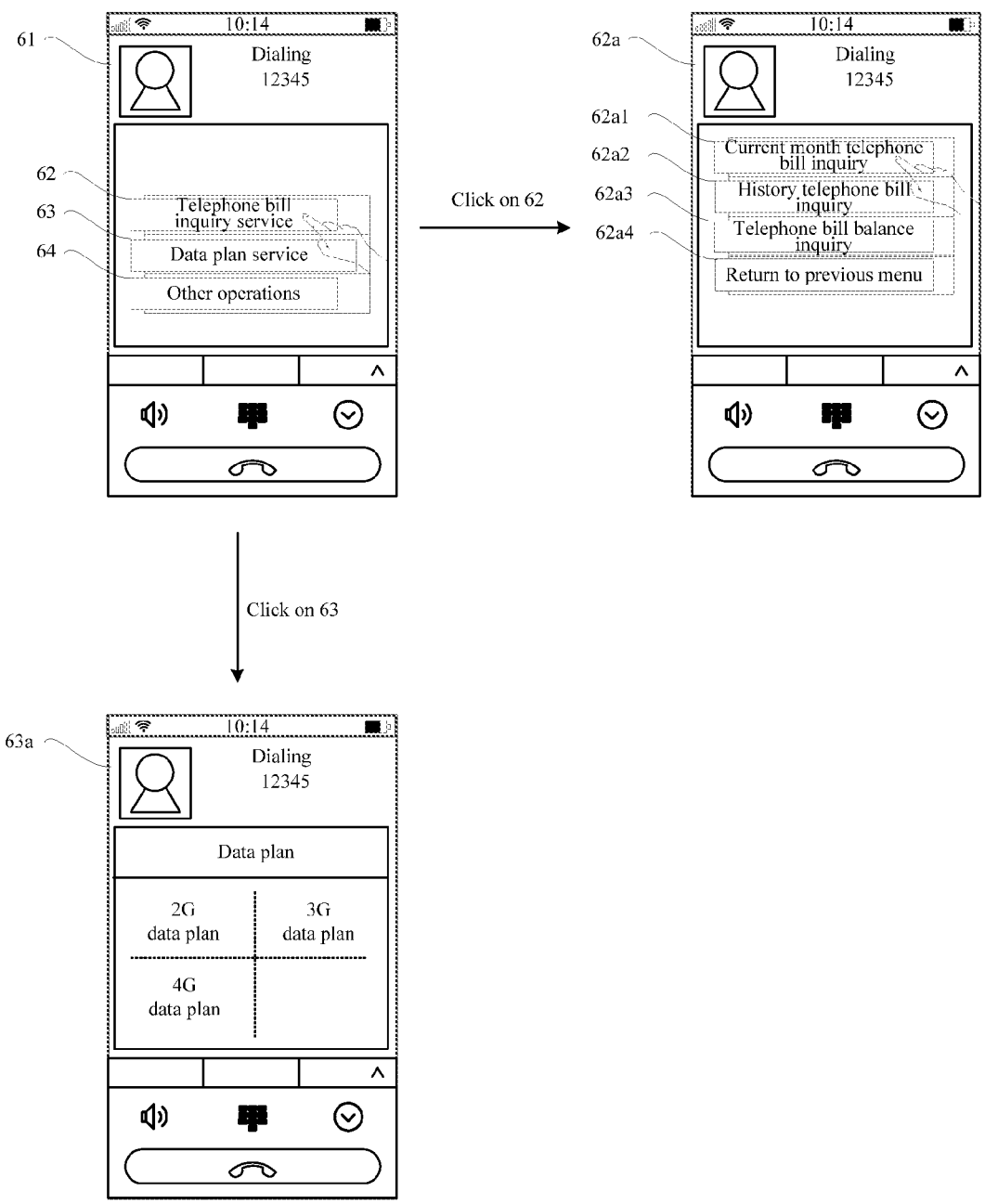
FIG. 6B is a schematic diagram illustrating an information acquisition page according to the embodiment shown in FIG. 6A.

For example, as shown in FIG. 6B, a page 61 is a homepage of an information acquisition page in the form of a webpage, including a "Telephone bill inquiry service" button 62, a "Data plan service" button 63, and an "Other operations" button 64. When the user clicks on the button 62, the user terminal switches to a subpage 62a. When the user clicks on the button 63, the user terminal switches to a subpage 63a. The subpage 62a includes a "Current month telephone bill inquiry" button 62a1, a "History telephone bill inquiry" button 62a2, a "Telephone bill balance inquiry" button 62a3, and a "Return to previous menu" button 62a4.

In some embodiments, the display control signal is sent by the customer service staff. In this scenario, the telephone agent system receives a display control instruction, which can be sent by the customer service staff of the telephone agent system via the telephone agent system, or can be sent by a preset program in the telephone agent system. The telephone agent system sends a display control signal to the user terminal according to the display control instruction, after receiving the display control instruction. The user terminal receives the display control signal sent by the telephone agent system through the data channel.

As shown in FIG. 6B, the telephone agent system can control the user terminal to display the subpage 62a through the display control signal, to allow the user to select a voice service.

In some embodiments, the user terminal may acquire the display control signal through at least one of the two approaches described above, and the user terminal may be controlled by at least one of the user or the telephone agent system. After acquiring the display control signal, the user terminal displays the information acquisition page on the call interface according to the display control signal.

At 605, when the user terminal receives the feedback information on the information acquisition page, it sends the feedback information to the telephone agent system through the data channel. For example, after the user terminal enters into the subpage 62a according to the operation of the user or under the control of the telephone agent system, the user can send the feedback information by clicking on one of the "Current month telephone bill inquiry" button 62a1, the "History telephone bill inquiry" button 62a2, the "Telephone bill balance inquiry" button 62a3, or the "Return to previous menu" button 62a4, and the feedback information can include information about what voice service is needed by the user.

At 606, the telephone agent system establishes a voice channel with the user terminal according to the feedback information. That is, after receiving the information about what voice service is needed by the user, the telephone agent system establishes a corresponding data channel. For example, as shown in FIG. 6B, when the user clicks on the "Current month telephone bill inquiry" button 62a1, the telephone agent system establishes a voice channel with the user terminal for inquiring about the current month telephone bill.

Devices consistent with embodiments of the disclosure will be described below. The above-described methods can be referred to for details of the functions of the devices and various components thereof.

Figure 7:
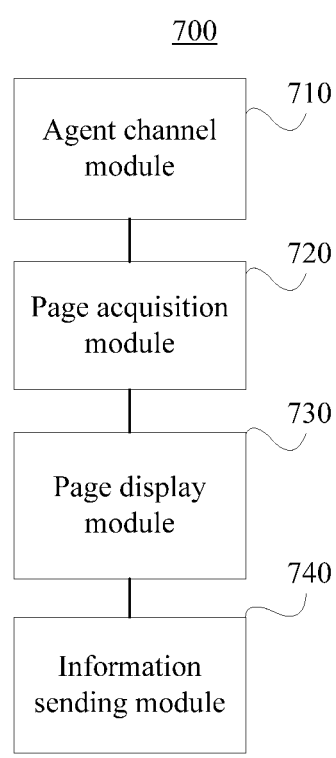
FIG. 7 is a block diagram illustrating an information acquisition device according to an exemplary embodiment.

FIG. 7 is a block diagram illustrating an exemplary information acquisition device 700 consistent with embodiments of the disclosure. The information acquisition device 700 can constitute the user terminal 110 in the implementation environment shown in FIG. 1 or a part thereof through software, hardware, or a combination of both. The information acquisition device 700 includes an agent channel module 710, a page acquisition module 720, a page display module 730, and an information sending module 740.

The agent channel module 710 is configured to establish a data channel with a telephone agent system when a voice call between the user terminal and the telephone agent system is conducted. The page acquisition module 720 is configured to acquire an information acquisition page provided by the telephone agent system through the data channel. The page display module 730 is configured to display the information acquisition page. The information sending module 740 is configured to send feedback information to the telephone agent system through the data channel when the feedback information is provided on the information acquisition page.

Figure 8:
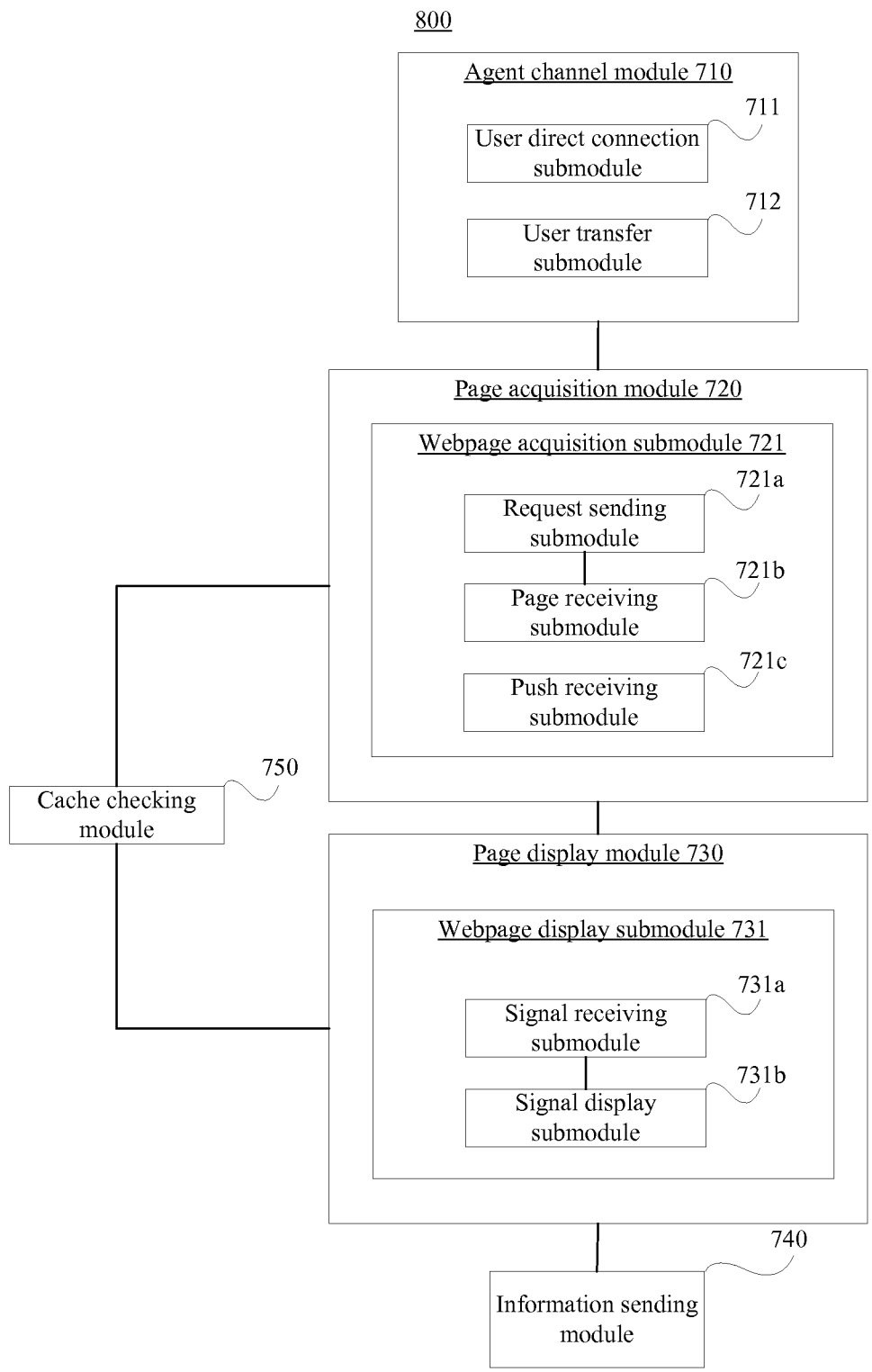
FIG. 8 is a block diagram illustrating an information acquisition device according to another exemplary embodiment.

FIG. 8 is a block diagram illustrating another exemplary information acquisition device 800 consistent with embodiments of the disclosure. The information acquisition device 800 can constitute the user terminal 110 in the implementation environment shown in FIG. 1 or a part thereof through software, hardware, or a combination of both. Similar to the information acquisition device 700, the information acquisition device 800 also includes the agent channel module 710, the page acquisition module 720, the page display module 730, and the information sending module 740.

In some embodiments, as shown in FIG. 8, the page acquisition module 720 includes a webpage acquisition submodule 721 configured to acquire an information acquisition page provided by the telephone agent system in the form of a webpage through the data channel. The webpage acquisition submodule 721 in turn includes a request sending submodule 721a and a page receiving submodule 721b. In some embodiments, as shown in FIG. 8, the webpage acquisition submodule 721 also includes a push receiving submodule 721c.

The request sending submodule 721a is configured to send a page acquisition request to the telephone agent system through the data channel. The page receiving submodule 721b is configured to receive the information acquisition page in the form of a webpage returned by the telephone agent system according to the page acquisition request. The push receiving submodule 721c is configured to receive the information acquisition page in the form of a webpage pushed by the telephone agent system through the data channel.

In some embodiments, as shown in FIG. 8, the page display module 730 includes a webpage display submodule 731 configured to load and display the information acquisition page in the form of a webpage on a call interface for conducting a voice call with the telephone agent system. The webpage display submodule 731 includes a signal receiving submodule 731a and a signal display submodule 731b. The signal receiving submodule 731a is configured to receive a display control signal, which may be triggered by a user and/or sent by the telephone agent system. The signal display submodule 731b is configured to display the information acquisition page on a call interface of the user terminal according to the display control signal.

In some embodiments, as shown in FIG. 8, the information acquisition device 800 further includes a cache checking module 750 configured to check whether the latest version of the information acquisition page corresponding to the telephone agent system is cached in the user terminal.

In some embodiments, as shown in FIG. 8, the agent channel module 710 includes at least one of a user direct connection submodule 711 or a user transfer submodule 712. The user direct connection submodule 711 is configured to directly establish the data channel with the telephone agent system, while the user transfer submodule 712 is configured to establish the data channel between the user terminal and the telephone agent system through a third-party service platform.

Figure 9:
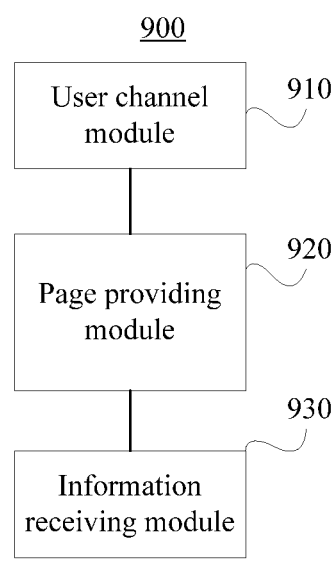
FIG. 9 is a block diagram illustrating an information acquisition device according to another exemplary embodiment.

FIG. 9 is a block diagram illustrating another information acquisition device 900 consistent with embodiments of the present disclosure. The information acquisition device 900 can constitute the telephone agent system 120 in the implementation environment shown in FIG. 1 or as a part thereof through software, hardware, or a combination of both. The information acquisition device 900 includes a user channel module 910, a page providing module 920, and an information receiving module 930.

The user channel module 910 is configured to establish a data channel with a user terminal when a voice call between the user terminal and the telephone agent system is conducted. The page providing module 920 is configured to provide the user terminal with an information acquisition page through the data channel, where the user terminal then displays the information acquisition page and receives feedback information on the information acquisition page. The information receiving module 930 is configured to receive the feedback information sent by the user terminal through the data channel.

Figure 10:
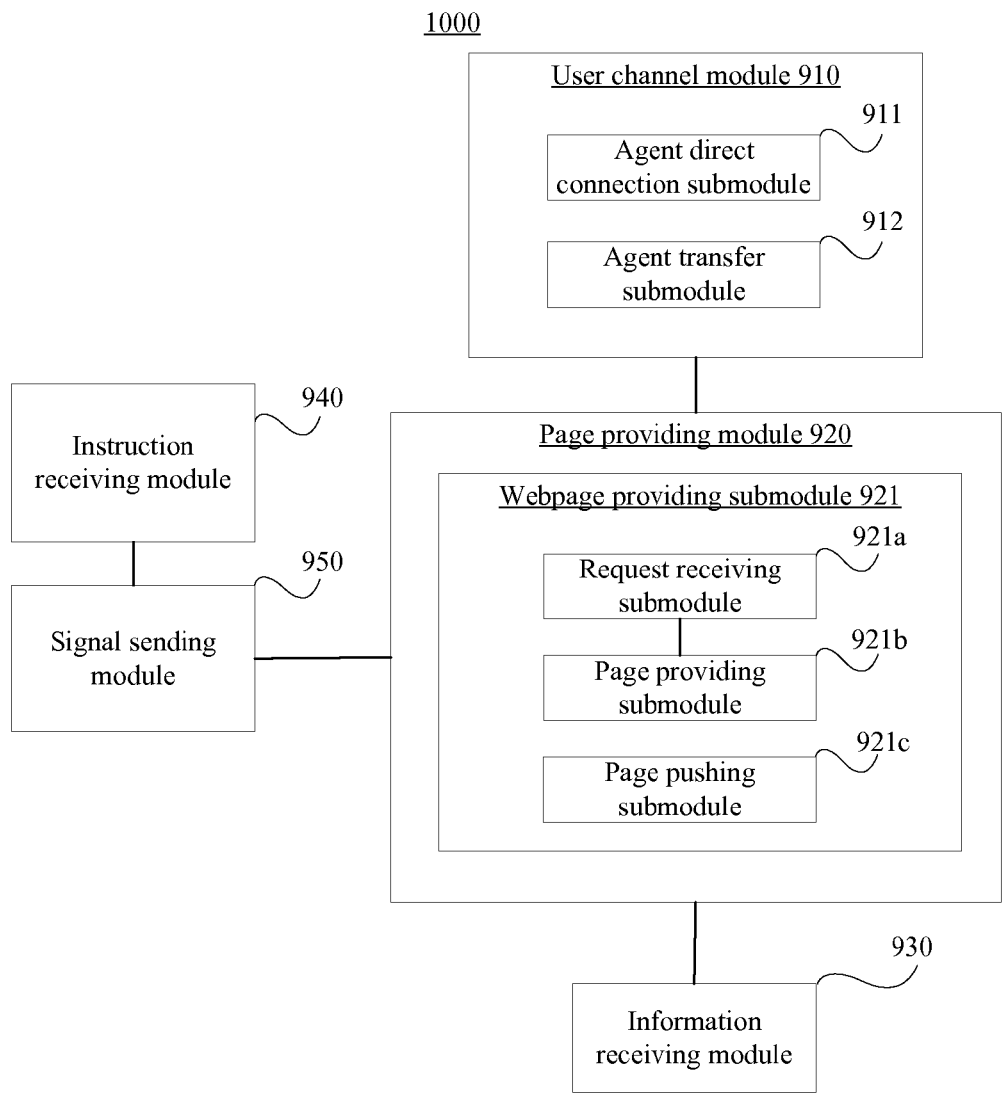
FIG. 10 is a block diagram illustrating an information acquisition device according to another exemplary embodiment.

FIG. 10 is a block diagram illustrating another information acquisition device 1000 consistent with embodiments of the present disclosure. The information acquisition device 1000 may be implemented as the telephone agent system 120 in the implementation environment as shown in FIG. 1 in part or in whole by means of software or hardware or combination of both. Similar to the information acquisition device 900, the information acquisition device 1000 also includes the user channel module 910, the page providing module 920, and the information receiving module 930.

In some embodiments, as shown in FIG. 10, the page providing module 920 includes a webpage providing submodule 921 configured to provide the user terminal with an information acquisition page in the form of a webpage through the data channel. The webpage providing submodule 921 in turn includes a request receiving submodule 921*a* and a page providing submodule 921*b*. In some embodiments, as shown in FIG. 10, the webpage providing submodule 921 also includes a page pushing submodule 921*c*.

The request receiving submodule 921*a* is configured to receive a page acquisition request sent by the user terminal through the data channel. The page providing submodule 921*b* is configured to provide the user terminal with the information acquisition page in the form of a webpage according to the page acquisition request. The page pushing submodule 921*c* is configured to push the information acquisition page in the form of a webpage to the user terminal through the data channel.

In some embodiments, as shown in FIG. 10, the information acquisition device 1000 further includes an instruction receiving module 940 configured to receive a display control instruction and a signal sending module 950 configured to send a display control signal to the user terminal according to the display control instruction. The user terminal then displays the information acquisition page on a call interface according to the display control signal.

In some embodiments, as shown in FIG. 10, the user channel module 910 includes at least one of an agent direct connection submodule 911 or an agent transfer submodule 912. The agent direct connection submodule 911 is configured to directly establish the data channel with the user terminal. The agent transfer submodule 912 is configured to establish the data channel between the telephone agent system and the user terminal through a third-party service platform.

Figure 11:
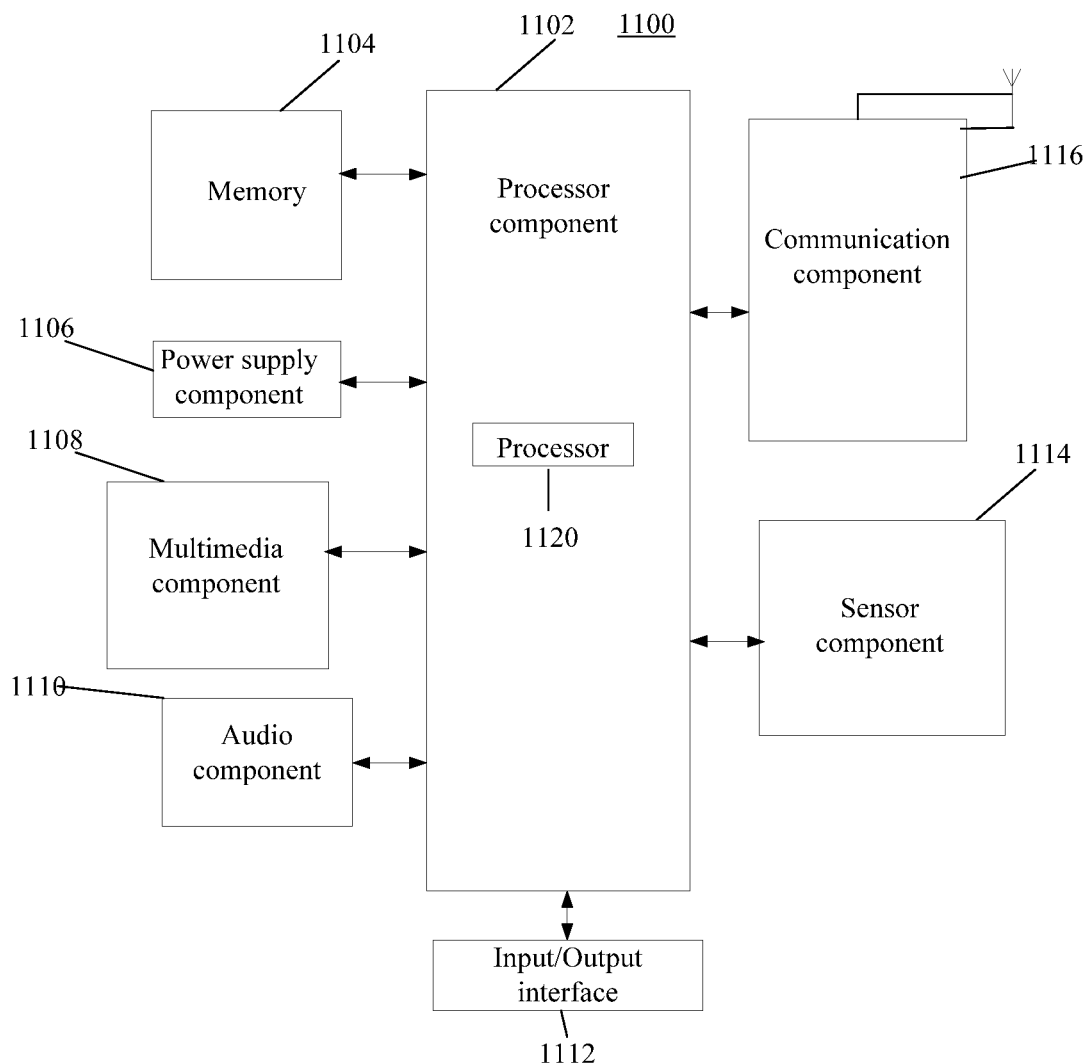
FIG. 11 is a block diagram illustrating an information acquisition device according to an exemplary embodiment.

FIG. 11 is a block diagram illustrating an exemplary device 1100 serving as a user terminal in an information acquisition method consistent with embodiments of the disclosure. For example, the device 1100 may be a mobile telephone, a computer, a digital broadcasting terminal, a message transceiver device, a game console, a tablet device, a medical device, a fitness facility, a PDA (personal digital assistant), or the like.

Referring to FIG. 11, the device 1100 includes one or more of a processor component 1102, a memory 1104, a power supply component 1106, a multimedia component 1108, an audio component 1110, an input/output (I/O) interface 1112, a sensor component 1114, and a communication component 1116.

The processor component 1102 generally controls the overall operation of the device 1100, such as display, telephone call, data communication, and operation associated with camera operation and record operation. The processor component 1102 may include one or a plurality of processors 1120 for executing instructions to perform all or a part of the above described methods. In addition, the processor component 1102 may include one or a plurality of modules for purpose of interaction between the processor component 1102 and other components. For example, the processor component 1102 may include a multimedia module for purpose of interaction between the multimedia component 1108 and the processor component 1102.

The memory 1104 is configured to store various types of data so as to support the operation of the device 1100. Examples of the data include any application program or approach for operation on the device 1100, including contact data, phonebook data, message, picture and video, etc. The memory 1104 may be implemented by any type of volatile or non-volatile memory device or combination thereof, such as static random access memory (SRAM), electrically erasable programmable read-only memory (EEPROM), erasable programmable read only memory (EPROM), programmable read-only memory (PROM), read-only memory (ROM), magnetic memory, flash memory, magnetic disk, or optical disk.

The power supply component 1106 supplies power to various components of the device 1100. The power supply component 1106 may include a power management system, one or a plurality of power supplies, and other components associated with generation, management and distribution of power for the device 1100.

The multimedia component 1108 includes a screen between the device 1100 and a user for providing an output interface. In some embodiments, the screen may include an LCD (Liquid Crystal Display) and a touch panel (TP). If the screen includes a touch panel, the screen may be implemented as a touch screen for receiving input signal from users. The touch panel includes one or a plurality of touch sensors for sensing of touching, sliding and gestures on the touch panel. The touch sensor not only can sensor trip boundary of touching or sliding, but also can detect the duration and pressure related to the touching or sliding operation. In some embodiments, the multimedia component 1108 includes a front-facing camera and/or a rear-facing camera. When the device 1100 is under an operation mode, such as capture mode or video mode, the front-facing camera and/or the rear-facing camera may receive external multimedia data. Each of front-facing camera and rear-facing camera may be a fixed optical lens system or may have focal length and optical zoom capacity.

The audio component 1110 is configured to output and/or input audio signal. For example, the audio component 1110 includes a microphone (MIC), configured to receive external audio signals when the device 1100 is under an operation mode such as a call mode, a record mode, or a speech recognition mode. The audio signal received may be further stored in the memory 1104 or sent out by the communication component 1116. In some embodiments, the audio component 1110 also includes a loudspeaker for outputting audio signal.

The I/O interface 1112 provides interface between the processor component 1102 and peripheral interface modules, the peripheral interface modules may be a keyboard, a click wheel or buttons, etc. These buttons may include but not limited to: home button, volume button, start button and locking button.

The sensor component 1114 includes one or a plurality of sensors for providing the device 1100 with state evaluation from all aspects. For example, the sensor component 1114 may detect the on/off state of the device 1100, relative positioning of components, for example, the components include the displayer and keypads of the device 1100; the sensor component 1114 also may also detect the position change of the device 1100 or a component thereof, the presence or absence of users' touch on the device 1100, the direction or acceleration/deceleration of the device 1100, and temperature variation of the device 1100. The sensor component 1114 may also include a proximity detector, which is configured to detect the presence of nearby objects without physical touch. The sensor component 1114 may also include an optical sensor, such as CMOS or CCD image sensor for imaging application. In some embodiments, the sensor component 1114 may also include an acceleration sensor, a gyro sensor, a magnetic sensor, a pressure sensor, or a temperature sensor.

The communication component 1116 is configured to facilitate wired communication or wireless communication between the device 1100 and other equipment. The device 1100 is available for access to wireless network based on communication standards, such as WiFi, 2G or 3G, or combination thereof. In an exemplary embodiment, the communication component 1116 receives by means of a broadcast channel the broadcast signal or broadcast-related information from external broadcast management systems. In an exemplary embodiment, the communication component 1116 also includes a near field communication (NFC) module for promoting short-range communication. For example, the NFC module may be implemented on the basis of Radio Frequency Identification (RFID) Technology, Infrared Data Association (IrDA) Technology, Ultra-wide Bandwidth (UWB) Technology, Bluetooth (BT) Technology and other technologies.

In exemplary embodiments, the device 1100 may be implemented by one or a plurality of application specific integrated circuits (ASIC), digital signal processors (DSP), digital signal processing equipment (DSPD), programmable logic devices (PLD), field programmable gate arrays (FPGA), controllers, microcontrollers, microprocessors or other electronic components, configured to execute the above methods.

In exemplary embodiments, a non-transitory computer-readable storage medium including instructions is also provided, for example, a memory 1104 including instructions, which may be executed by the processors 1120 of the device 1100 so as to implement the above methods. For example, the non-transitory computer-readable storage medium may be a ROM, a random access memory (RAM), CD-ROM, a magnetic tape, a floppy disk, an optical data storage device, etc.

A non-transitory computer-readable storage medium, wherein when instructions in the storage medium are executed by processors of the device 1100, the device 1100 may execute an information acquisition method consistent with embodiments of the present disclosure.

Figure 12:
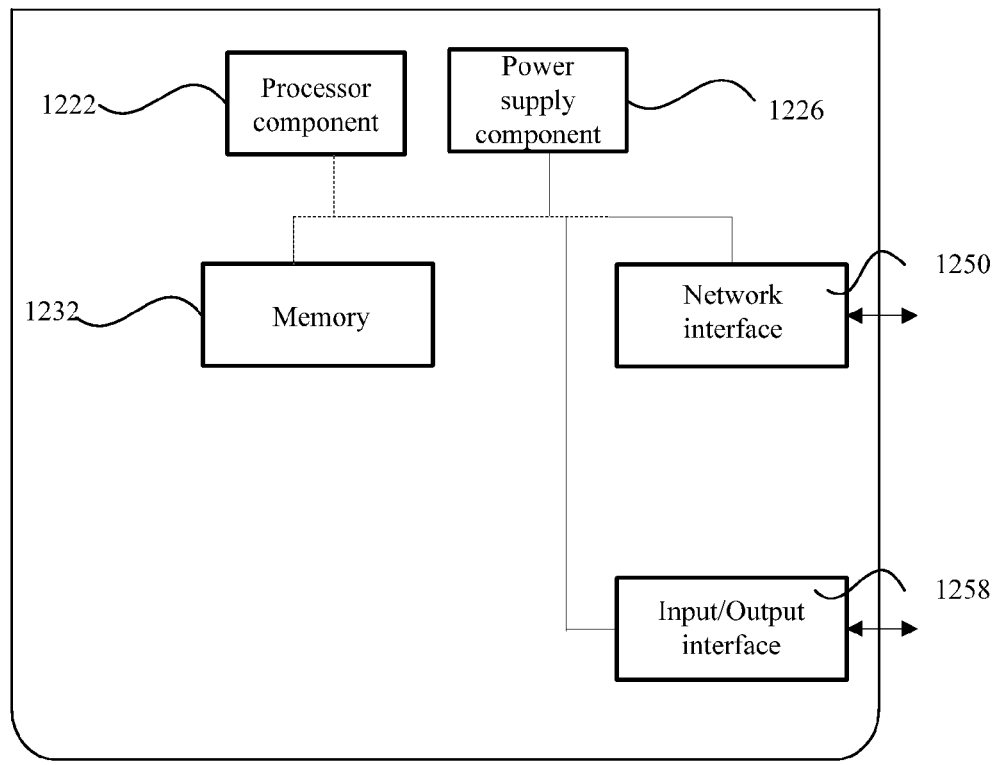
FIG. 12 is a block diagram illustrating an information acquisition device according to an exemplary embodiment.

FIG. 12 is a block diagram illustrating another exemplary information acquisition device 1200 consistent with embodiments of the present disclosure. For example, the device 1200 may be provided as a telephone agent system or a third-party service platform. Referring to FIG. 12, the device 1200 includes a processor component 1222, which further includes one or more processors, and a memory 1232 configured to store instructions, such as application program, that may be executed by the processor component 1222. The application program stored in the memory 1232 may include one or more parts, each of which corresponds to a set of instructions. In addition, the processor component 1222 is configured to execute instructions to perform an information acquisition method consistent with embodiments of the present disclosure.

The device 1200 also includes a power supply module 1226 configured to execute power management of the device 1200, a wired or wireless network interface 1250 configured to connect the device 1200 to a network, and an input/output (I/O) interface 1258. The device 1200 can run an operating system stored in the memory 1232, such as Windows Server™, Mac OS X™, Unix™, Linux™, FreeBSD™, or another similar operating system.

Figure 13:
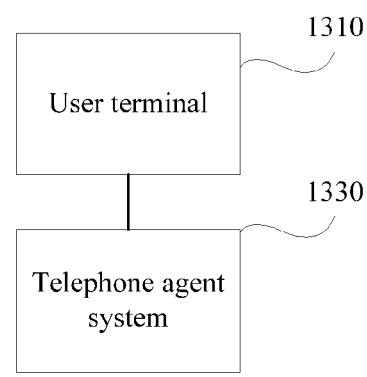
FIG. 13 is a block diagram illustrating an information acquisition system according to an exemplary embodiment.

FIG. 13 is a schematic diagram illustrating another exemplary information acquisition system 1300 consistent with embodiments of the present disclosure. The system 1300 includes a user terminal 1310 and a telephone agent system 1330. The user terminal 1310 may be, for example, a device shown in FIG. 7, FIG. 8, or FIG. 11. The telephone agent system 1330 may be, for example, a device shown in FIG. 9, FIG. 10, or FIG. 12.

In a conventional technology using text messages for conducting satisfaction surveys or acquiring information after voice calls, users are required to conduct relatively more input operations and if the format of the text messages is incorrect, the satisfaction survey or information acquisition would fail. Further, with the conventional technology, the efficiency of information acquisition is low. In contrast, according to the present disclosure, an information acquisition page is acquired through a data channel established between a user terminal and a telephone agent system and a user satisfaction survey or information acquisition is conducted using the information acquisition page. Therefore, the users only need to perform simple operations on the information acquisition page for the telephone agent system to acquire feedback information.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An information acquisition method, comprising:
   establishing a data channel with a telephone agent system after a voice call is conducted with the telephone agent system, wherein the data channel is established in a packet switched domain and the voice call is established in a circuit switched domain;
   loading and displaying an information acquisition page provided by the telephone agent system through the data channel on a call interface used for conducting the voice call established in the circuit switched domain, wherein the displaying of the information acquisition page on the call interface of the user terminal is controlled by a display control signal sent from the telephone agent system;
   receiving feedback information via the information acquisition page; and
   sending the feedback information to the telephone agent system through the data channel.

2. The method according to claim 1, further comprising:
   acquiring the information acquisition page provided by the telephone agent system through the data channel.

3. The method according to claim 2, wherein acquiring the information acquisition page includes at least one of:
   sending a page acquisition request to the telephone agent system through the data channel and receiving the information acquisition page returned by the telephone agent system according to the page acquisition request; or
   receiving the information acquisition page pushed by the telephone agent system through the data channel.

4. The method according to claim 2, wherein acquiring the information acquisition page includes acquiring one or more subpages organized according to a tree structure.

5. The method according to claim 1, further comprising:
   checking whether a latest version of the information acquisition page corresponding to the telephone agent system has been cached, wherein:
   if the latest version of the information acquisition page has not been cached, the method further comprises acquiring the latest version of the information acquisition page provided by the telephone agent system through the data channel; or
   if the latest version of the information acquisition page has been cached, displaying the information acquisition page includes displaying the cached latest version of the information acquisition page.

6. The method according to claim 1, wherein establishing the data channel with the telephone agent system includes:
   directly establishing the data channel with the telephone agent system; or
   establishing the data channel with the telephone agent system through a third-party service platform.

7. An information acquisition method, comprising:
   establishing a data channel with a user terminal after a voice call is conducted with the user terminal, wherein the data channel is established in a packet switched domain and the voice call is established in a circuit switched domain;
   providing an information acquisition page to the user terminal through the data channel, wherein the information acquisition page is to be displayed on a call interface of the user terminal used for conducting the voice call established in the circuit switched domain;
   sending to the user terminal a display control signal to control displaying of the information acquisition page on the call interface of the user terminal; and
   receiving feedback information sent by the user terminal through the data channel.

8. The method according to claim 7, wherein providing the information acquisition page to the user terminal includes providing the information acquisition page in a form of webpage to the user terminal through the data channel.

9. The method according to claim 8, wherein providing the information acquisition page to the user terminal includes:
   receiving a page acquisition request sent by the user terminal through the data channel and providing the information acquisition page to the user terminal according to the page acquisition request; or
   pushing the information acquisition page to the user terminal through the data channel.

10. The method according to claim 8, wherein providing the information acquisition page includes providing one or more subpages organized according to a tree structure.

11. The method according to claim 7, wherein establishing the data channel with the user terminal includes:
    directly establishing the data channel with the user terminal; or
    establishing the data channel with the user terminal through a third-party servicE platform.

12. An information acquisition device, comprising:
    a processor; and
    a non-transitory computer readable storage medium storing instructions that, when executed by the processor, cause the processor to:
    establish a data channel with a telephone agent system after a voice call is conducted with the telephone agent system, wherein the data channel is established in a packet switched domain and the voice call is established in a circuit switched domain;
    load and display an information acquisition page provided by the telephone agent system through the data channel on a call interface used for conducting the voice call established in the circuit switched domain, wherein the displaying of the information acquisition page on the call interface of the user terminal is controlled by a display control signal sent from the telephone agent system;
    receive feedback information via the information acquisition page; and
    send the feedback information to the telephone agent system through the data channel.

13. The device according to claim 12, wherein the instructions further cause the processor to:
    acquire the information acquisition page provided by the telephone agent system through the data channel.

14. The device according to claim 13, wherein the instructions further cause the processor to:
    send a page acquisition request to the telephone agent system through the data channel and receive the information acquisition page returned by the telephone agent system according to the page acquisition request; or
    receive the information acquisition page pushed by the telephone agent system through the data channel.

15. The device according to claim 12, wherein the instructions further cause the processor to:
- directly establish the data channel with the telephone agent system; or
- establish the data channel with the telephone agent system through a third-party service platform.

16. An information acquisition device, comprising:
a processor; and
a non-transitory computer readable storage medium storing instructions that, when executed by the processor, cause the processor to:
- establish a data channel with a user terminal after a voice call is conducted with the user terminal, wherein the data channel is established in a packet switched domain and the voice call is established in a circuit switched domain;
- provide an information acquisition page to the user terminal through the data channel, wherein the information acquisition page is to be displayed on a call interface of the user terminal used for conducting the voice call established in the circuit switched domain;
- send to the user terminal a display control signal to control displaying of the information acquisition page on the call interface of the user terminal; and
- receive feedback information sent by the user terminal through the data channel.

* * * * *